March 17, 1964     C. DE GANAHL     3,125,483
APPARATUS FOR MAKING GLASS FIBER REINFORCED PLASTIC PIPE
Filed Nov. 8, 1960     2 Sheets-Sheet 1
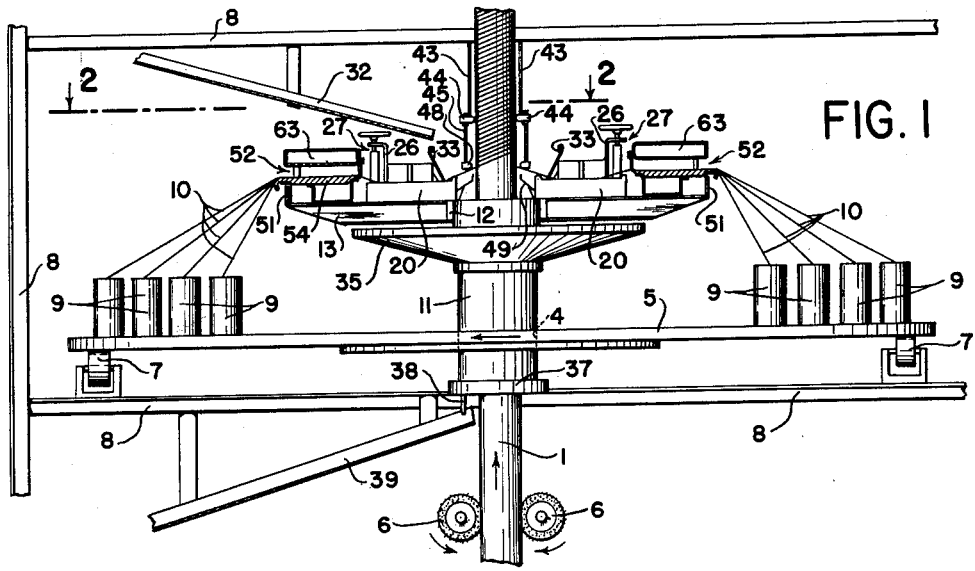
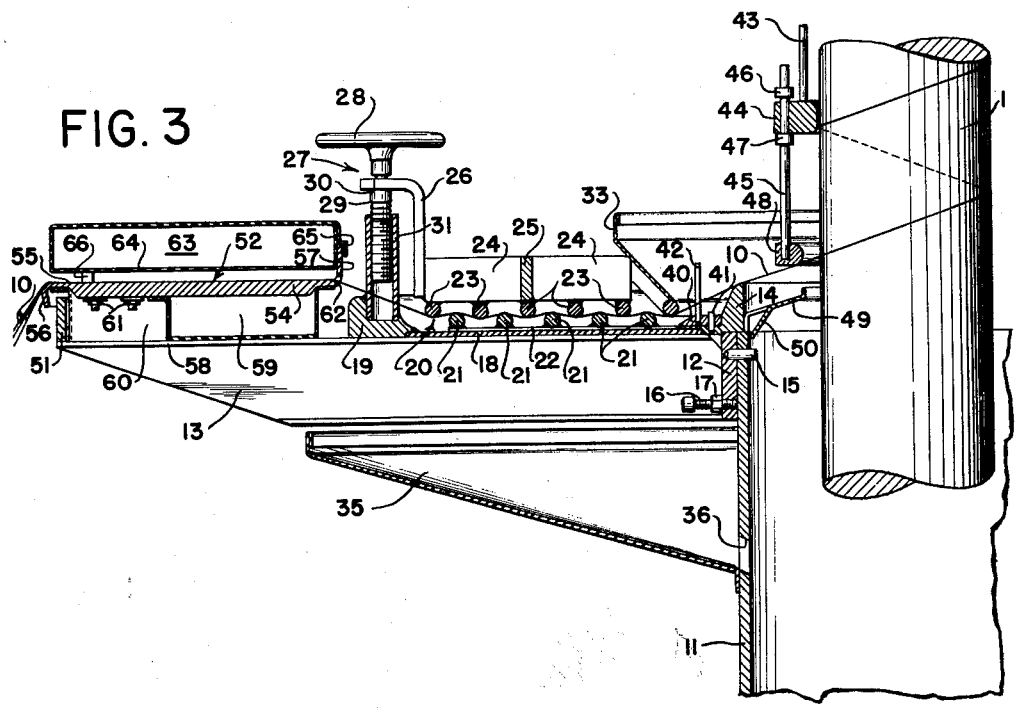
INVENTOR.
Carl de Ganahl
ATTORNEYS INVENTOR.
Carl de Ganahl Patented Mar. 17, 1964

3,125,483
APPARATUS FOR MAKING GLASS FIBER REINFORCED PLASTIC PIPE
Carl de Ganahl, Greenlawn, N.Y. (% Spiral Glas Pipe Co., P.O. Box 195, Old Bridge, N.J.)
Filed Nov. 8, 1960, Ser. No. 68,135
3 Claims. (Cl. 156—432)

This invention relates to pipe made from a glass fiber reinforced plastic composition. In particular, the invention relates to an improved method of fabricating glass fiber reinforced plastic pipe in which multi-filament glass fiber reinforcing rovings are heated immediately before an uncured liquid plastic resin composition is applied to them, and are brought into contact with the plastic composition while still at an elevated temperature to insure effective impregnation of the interstices of the rovings with the plastic composition. The invention further entails a new apparatus for carrying out this method of fabricating pipe. This application is a continuation in part of my copending application Serial No. 615,711, filed October 12, 1956, now abandoned, which is a continuation-in-part of my now abandoned application Serial No. 398,098, filed December 14, 1953.

In Patent No. 2,714,414, granted August 2, 1955, jointly to John A. Grant, Clare E. Bacon, and myself, there is disclosed an improved method of fabricating plastic pipe which comprises passing glass fiber rovings through a body of uncured liquid plastic composition, directing such coated rovings in helical layers onto an upwardly advancing mandrel, and treating the layers on the mandrel to set the plastic composition. The pipe thus formed is then stripped from the mandrel.

One of the difficulties encountered in forming reinforced plastic pipe of this type lies in securing good impregnation of the interstices of the glass fiber rovings with the liquid plastic resin composition and good adhesion of the cured plastic to the surfaces of the glass fiber rovings. This is particularly important when the plastic pipe is to be employed in uses which involve subjecting it to great internal pressures, as the strength of the pipe is to a large extent dependent upon the quality of bonding that is achieved between the glass fiber rovings and the plastic material, and this in turn is dependent upon achieving effective impregnation of the rovings.

I have found that when the glass fiber rovings used in forming pipe by the method of the aforesaid U.S. Patent No. 2,714,414 are heated immediately before application thereto of the plastic resin composition, and when such rovings while they are still at an elevated temperature are immersed in a bath of the liquid plastic resin composition, a much improved impregnation of the rovings results and an improved bond is attained between the rovings and the plastic composition, thereby increasing the strength of the pipe. Moreover, the surfaces of the fibers of the glass fiber rovings are coated with sizing compounds, usually organic silicon or silane compositions, by the manufacturer thereof, and I have found that when the glass fiber rovings are heated to a temperature sufficient to "heat clean" the rovings, that is, sufficient to remove the organic sizing material from the surface of the rovings by thermal decomposition or burning thereof, the strength of the bond between the cured plastic composition and the rovings is drastically reduced. That is to say, I have found that when the rovings are heated to within a certain elevated temperature range prior to impregnation thereof and are maintained at an elevated temperature as they are immersed in the body of the liquid resin composition, the strength of the bond that is obtained between the glass fiber rovings and the cured plastic resin is substantially greater than that obtained when the glass fiber rovings are heated to a temperature sufficient to heat clean the surfaces of the fibers or when the rovings are immersed in the liquid resin composition after they had been allowed to cool below a certain minimum temperature as hereinafter specified. In particular tests have demonstrated that when the glass fiber rovings are heated to a temperature sufficient to effect removal of the sizing compounds therefrom (for example, a temperature of above about 800° F.) the tensile strength of the wall of a pipe made in accordance with the method of the aforesaid patent (measured in a direction in which the glass fibers do not contribute any reinforcement) is much smaller than the tensile strength of a pipe wall in which the glass fibers are heated to a temperature below that at which they become heat cleaned (for example, a temperature of about 600° F.).

It is necessary that the fiber glass rovings be heated to a temperature that is high enough to insure thorough impregnation of the rovings with the liquid plastic resin composition but below that at which silane or other sizing on the rovings is removed therefrom, and the heating of the rovings must be accomplished immediately prior to their immersion into the liquid plastic composition in order to insure that the rovings are introduced into the plastic composition while they are at an elevated temperature. Specifically, I have found that the rovings should be heated to a temperature substantially above 200° F. and below that at which the sizing on the rovings is removed by thermal decomposition thereof, and advantageously to a temperature in the range of about 300° F. to about 600° F.; and they should still be at a temperature above 200° F. and preferably above 250° F. (say at a temperature in the range of from about 250° F. to about 400° F. or even higher), at the moment they enter into the liquid plastic composition.

An apparatus for fabricating the improved pipe of this invention comprises a rotatable table having a central opening therein, a mandrel, and power driven means for advancing the mandrel through the table opening at a fixed rate relative to the rate of rotation of the table. The table carries means for supporting a plurality of packages of glass fiber rovings. A heating oven, preferably annular in form, is mounted on the table between the supporting means for the roving packages and the central opening, the oven being capable of heating the glass fiber rovings drawn therethrough to a temperature above 300° F. and below that at which any sizing of the rovings will be thermally decomposed and/or burned off. An annular pan adapted to contain a supply of plastic resin composition is mounted on the table between the oven and the central opening in the table; and means are provided for guiding rovings from the roving supporting means successively through the oven and the plastic composition in the pan and then on to the advancing mandrel so that they are wrapped helically thereon as the mandrel advances through the rotating table.

A preferred embodiment of the method and apparatus of the invention is described below in conjunction with the accompanying drawings, in which FIG. 1 is an elevation, partially in section, of a pipe fabricating apparatus wherein glass fiber rovings are helically applied on an upwardly advancing mandrel;

FIG. 3 is a section taken substantially along the line 3—3 in FIG. 2.

Figure 2:
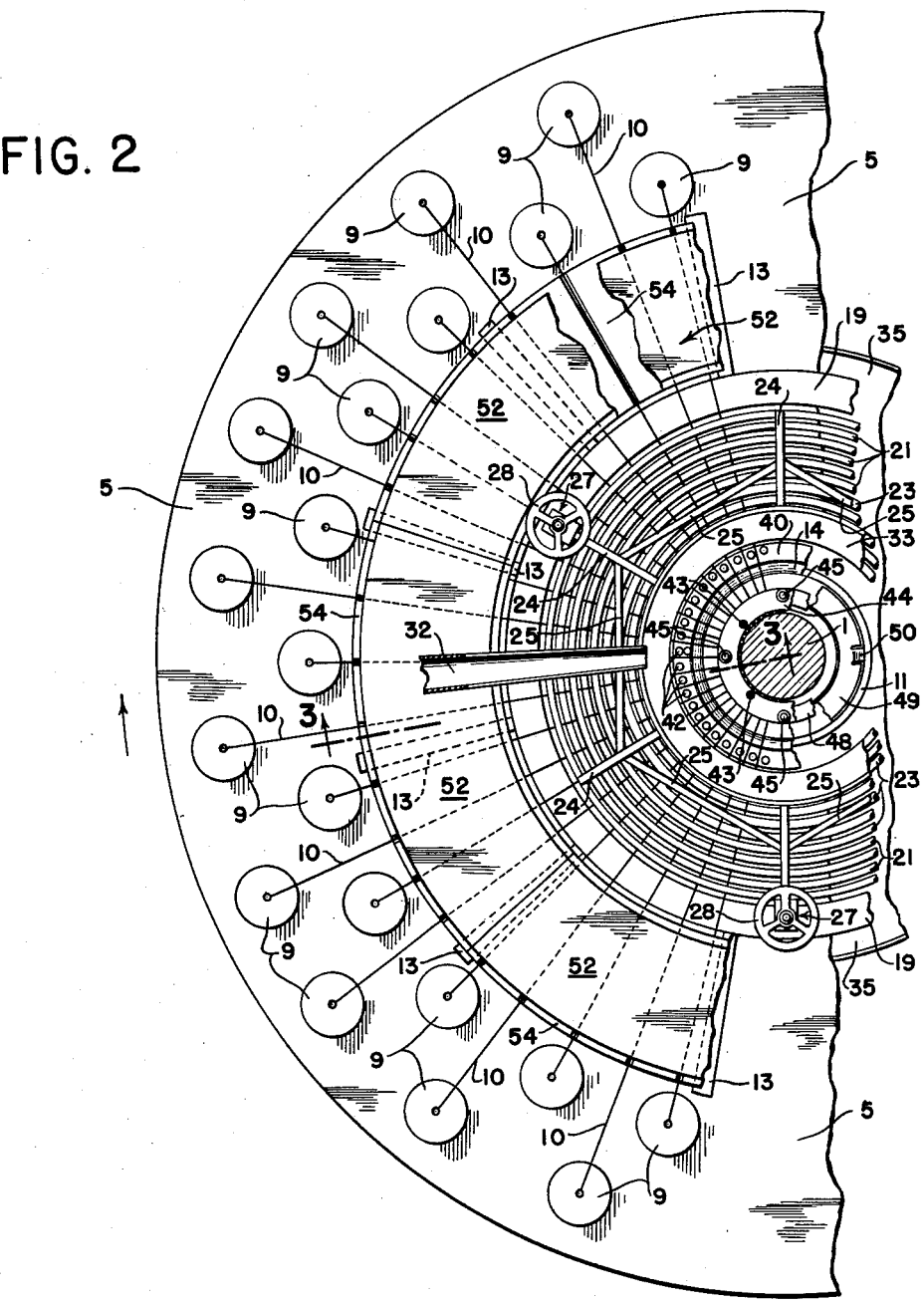
FIG. 2 is a view taken substantially along the line 2—2 in FIG. 1.

As shown in FIG. 1, the apparatus comprises a mandrel 1 which passes upwardly through a central opening 4 in a circular table 5. Means such as motor driven rubber-tired wheels 6 pressed tightly against the mandrel 1 below the table are provided for moving the mandrel upwardly at a uniform rate. The table 5 is supported in a horizontal plane on a series of spaced wheels or rollers 7 mounted on a supporting framework 8, and motive means (not shown) are provided to rotate the table 5 in the direction indicated by the arrow (FIG. 2). The table 5 carries about its outer periphery a plurality of packages 9 of glass fiber rovings 10.

A cylinder 11 is fixedly secured to the table 5 in the central opening 4 and rotates with the table 5. As shown more clearly in FIG. 3, a pan mounting flange ring 12 carrying a series of radially extending support channels 13 is removably mounted at the upper end of the cylinder 11. Welded or otherwise attached to the flange ring 12 is the inner diameter ring 14 of an annular resin pan, and this ring rests on the upper edge of the cylinder 11, thereby supporting the flange ring 12 and the support channels 13. A series of pins 15 extending through the cylinder 11 into the flange ring 12 are spaced around the flange ring 12 and lock these members together so that when the table 5 and the cylinder 11 are rotated, the flange ring 12, the support channels 13, and all structure carried thereby also rotate at the same rate. A series of set screws 16 and nuts 17 spaced around and threadedly engaged through the flange ring 12 provide a leveling adjustment for the structure which the flange ring carries.

The pan inner diameter ring 14 is welded to an annular bottom plate 18, which also is welded to a pan outer diameter ring 19 to form an open annular plastic dispensing pan 20 carried by the flange ring 12 and the support channels 13. A series of annular rings 21 are welded or otherwise secured to a series of radially extending supporting arms 22 which lie on the bottom plate 18 of the dispensing pan 20; and this assembly (of rings 21 and arms 22) may be removed from the pan when it is desired to clean the pan, or for other reasons. (The rings 21 might be secured to a solid annular plate instead of to the radial supporting arms 22, and such a unit would be removable in a similar manner.)

A series of annular rings 23 similar to the rings 21 are welded or otherwise secured to a supporting web frame consisting of radially extending arms 24 joined together by cross members 25. An upwardly extending hook member 26 is secured at the outer end of preferably three of the arms 24 at equi-angular intervals, and a like number of hand wheel adjustment assemblies 27 are provided to support the web frame. Each assembly 27 consists of a hand wheel 28 secured to a vertical shaft 29 having a shoulder 30 upon which the hook member 26 rests. The shaft 29 is threadedly received in a vertical nut 31 which is fixedly secured to the pan outer diameter ring 19.

The fiber glass rovings 10 in the plastic dispensing pan are caused to pass between the annular rings 21 and 23 to hold them immersed in the plastic resin composition, and to insure good contact between the rovings and the plastic material. The adjustment of the hand wheel assemblies 27 controls the vertical position of the annular rings 23, and since the lower annular rings 21 remain in a relatively fixed location, the adjustment of the hand wheel assemblies 27 provides for close control over the back tension applied to the glass fiber rovings 10.

The plastic composition is delivered to the dispensing pan 20 by gravity flow from a high level supply tank (not shown) through a stationary trough 32 which is mounted on the supporting framework 8. The liquid plastic is guided from the trough 32 into the pan 20 by means of an annular dispensing cone 33. Sufficient plastic composition is delivered to maintain the dispensing pan 20 full at all times. Any excess of the liquid plastic resin composition overflows into an overflow collecting cone 35 which is secured to the cylinder 11, and drains through openings 36 into the tubular cylinder 11. The excess plastic composition flows along the inner surface of the cylinder 11 into a stationary annular collecting vessel 37 mounted on the supporting framework 8; and from the collecting vessel 37 the excess plastic flows through a downspout 38 to a stationary trough 39 and thence to a low level collecting tank (not shown) for recycling.

A removable annular collar 40 lies on the bottom member 18 of the dispensing pan 20 adjacent to the pan inner diameter ring 14 and is held in fixed relation thereto by means of a series of vertical pins 41. Vertically extending roving spacing pins 42 are mounted at spaced intervals around the collar 40 and serve to guide the glass fiber rovings 10 as they leave the dispensing pan 20, and they prevent rotation of the pan 20 about the mandrel from pulling the rovings into a skewed path of travel through the pan.

A series of thin flexible vertically extending rods 43 closely spaced about the mandrel 1 are secured to the overhead supporting framework 8, and they in turn support a centering ring 44 at their lower terminus. A series of adjustable rods or bars 45 are spaced about and penetrate the centering ring 44. The upper portion of the bars 45 carry adjustably positionable collars 46 and 47 which permit the vertical adjustment of the bars 45. The lower ends of the bars 45 are secured to and support a leveling ring 48 which guides the coated glass fiber rovings on to the mandrel. By raising and lowering the leveling ring 48 by means of adjusting the collars 46 and 47 on the bars 45, accurate control over the uniformity with which the rovings 10 are distributed about the mandrel 1 is achieved. The centering ring 44 insures that the leveling ring 48 is at all times accurately centered about the mandrel, despite some tendency for it to sway as it moves up through the rotating table.

As the coated rovings pass under the leveling ring 48, there is a tendency for the ring to wipe and squeeze excess plastic composition from the rovings, and a rundown deflector cone 49 is secured to the inner surface of the pan inner diameter ring 14 to catch such excess plastic material. At spaced intervals about the deflector cone 49 a portion 50 of the cone adjacent to the pan inner diameter ring 14 is bent open to permit the excess plastic material to flow down the inner surface of the tubular cylinder 11 in a manner similar to that described in connection with the excess plastic composition caught by the overflow collecting cone 35.

A retaining ring 51 is secured at the outer periphery of the support channels 13 to hold in position a series of segment-shaped electrically heated ovens 52 which are spaced around the plastic dispensing pan 20 and removably supported upon the channels 13.

Each of the ovens 52 consists of an electrically heated hot plate 54 having a smooth upper surface 55, an overhanging curved lip 56 along its outer edge, and an upwardly curved section 57 along its inner edge. The hot plate 54 is removably mounted on an open box-like support 58. Suitable insulating material is provided in the interior section 59 of the box-like support 58, but a connection well 60 is left open to receive the wires by which power is supplied to the hot plates. The wires (not shown) are connected to each hot plate by binding posts 61. A series of exit openings 62 are transversely spaced across the hot plate 54 at the base of the upwardly curved section 57 to provide for passage of the rovings 10 which are drawn across the surface 55 of the hot plate 54. A closed box 63 preferably filled with an insulating material (not shown) and having a lower exterior reflecting surface 64 is removably mounted over the hot plate 54 by means of a downwardly extending lug 65 which is secured to a side member of the box 63 and is adapted to rest upon the upwardly curved section 57 of the hot plate 54. Further support for the closed box 63 is provided by a series of studs 66 secured to and spaced transversely across the surface 55 of the hot plate 54.

The oven 52 embodying the features above described is capable of heating the glass fiber rovings 10 as they are drawn across the surface 55 of the hot plate 54 to a temperature in the range from 300° F. to 600° F., or even higher if desired, but below that at which the sizing on the surfaces of the rovings is thermally decomposed or burned off. The path along which the rovings pass between the exit openings 62 of the hot plate and the point when they pass beneath the surface of the plastic composition must be short enough so that in the time it takes them to travel the length of this path they do not cool to below 200° F. Accordingly the length of the roving path between hot plate and plastic composition is preferably only a few inches. For example, with such path only about four inches long, and with the rovings advancing at the rate of eight feet per minute, it will take only about two and a half seconds for the rovings to become immersed in the plastic composition after leaving the hot plate. While the actual temperature of the rovings as they enter the resin will depend on the temperature to which they are heated by the hot plate, it is advantageous to keep the distance between hot plate and plastic composition short in order to keep short the time during which the heated rovings have a chance to cool after being heated by the hot plate. Preferably this time interval should not substantially exceed five seconds; and the foregoing example of about 2½ seconds is illustration of good practice. With this time interval adequately short, and by maintaining the hot plate oven temperature between say 400° F. and 600° F., the temperature of the rovings just before they dip beneath the surface of the plastic composition will be about 200° F., and may be up to 450° F. or even higher.

As the hot rovings pass beneath the surface of the plastic composition, the composition immediately adjacent the rovings is heated quickly to a high enough temperature for its viscosity to be greatly decreased. A typical liquid polyester resin composition at the temperautre at which it is used in making pipe in apparatus of the character described above has a high viscosity about like a very thick syrup. However, by introducing the glass fiber rovings into such resin composition in accordance with this invention, the viscosity of that portion of the resin immediately adjacent to incoming roving is reduced almost to that of water. As a result the resin thoroughly penetrates the interstices of the roving, and is enabled to wet the individual fibers more easily than if its viscosity did not become reduced.

The improved impregnation and wetting of the rovings that is achieved by the method of this invention leads to the formation of notably stronger pipe than can otherwise be produced provided the rovings are not heat cleaned prior to impregnation thereof. In particular, tests have demonstrated that pipe made in accordance with this invention possesses a wall in which the resin, as modified by the presence of the glass fibers, has a tensile strength (measured in a direction in which the glass fibers do not contribute any reinforcement) notably greater than similar pipe as heretofore made.

Only a single rotatable table 5 is shown in the accompanying drawings, but it is of course evident (as described in my aforementioned Patent No. 2,714,414) that a series of such tables may be arranged one above the other, whereby a number of layers of plastic coated rovings may be applied to the mandrel. When an adequate thickness of glass fiber and plastic composition has been built up on a convenient length of the mandrel, that length is removed, and the layers of glass fibers and the plastic composition are heated or otherwise treated to set or cure the plastic composition. Then the cured glass fiber reinforced plastic pipe is stripped from the mandrel.

Any plastic resin composition which can be applied in liquid form to the glass fiber rovings and can thereafter be cured or set to a substantially rigid solid may be employed in making the pipe by the method of the invention. Preferably the resin employed is a synthetic thermosetting material which can be dissolved in one or more coreactive solvents in the monomeric or low polymeric form to yield a viscous solution, and which thereafter is converted to an insoluble, infusible, high polymeric form by heating. Polyester resin compositions and epoxy resin compositions are examples of thermosetting resin compositions that have been used with success in carrying out the new method.

I claim:

1. In an apparatus for fabricating plastic pipe, a rotatable table having a central opening therein, a mandrel, power driven means for advancing the mandrel through said table opening at a fixed rate relative to the rate of rotation of the table, means for supporting a plurality of packages of sizing-coated glass fiber rovings on the table, a heating oven mounted on the table between said roving supporting means and the central opening of the table a dispensing pan for plastic resin composition mounted between said oven and the central opening of the table, and means for guiding rovings from the roving supporting means successively through the oven and the dispensing pan onto the mandrel.

2. In an apparatus for fabricating plastic pipe, a rotatable table having a central opening therein, a mandrel, power driven means for continuously advancing the mandrel upwardly through said table at a fixed rate relative to the rate of rotation of the table, means for supporting a plurality of packages of sizing-coated glass fiber rovings on the table, an annular oven mounted on the table between said roving supporting means and the central opening of the table, an annular dispensing pan for plastic resin composition mounted on the table between the oven and the central opening of the table, and means for guiding rovings from the roving supporting means successively through the oven and the dispensing pan and onto the mandrel.

3. In an apparatus for fabricating plastic pipe, means for supporting a plurality of packages of sizing-coated glass fiber rovings, a mandrel, a dispensing pan for liquid uncured resin composition mounted adjacent said mandrel, an oven mounted adjacent said pan, and means for guiding rovings from packages thereof on said supporting means through said oven and thence through said resin dispensing pan into the form of a helical wrapping on said mandrel, said oven being mounted with the roving-exit end thereof immediately adjacent the roving entrance into said dispensing pan.

References Cited in the file of this patent

UNITED STATES PATENTS

| | | |
|---|---|---|
| 2,446,119 | White | July 27, 1948 |
| 2,714,404 | De Ganahl et al. | Aug. 2, 1955 |
| 2,792,324 | Daley et al. | May 14, 1957 |

FOREIGN PATENTS

| | | |
|---|---|---|
| 526,044 | Canada | June 12, 1956 |

UNITED STATES PATENT OFFICE
CERTIFICATE OF CORRECTION

Patent No. 3,125,483                  March 17, 1964

Carl de Ganahl

It is hereby certified that error appears in the above numbered patent requiring correction and that the said Letters Patent should read as corrected below.

Column 4, line 15, for "supportig" read -- supporting --; column 5, line 33, for "temperautre" read -- temperature --; column 6, line 25, after "table" insert a comma; line 58, for "White" read -- White et al. --; line 59, for "2,714,404" read -- 2,714,414 --.

Signed and sealed this 14th day of July 1964.

(SEAL)

Attest:

ESTON G. JOHNSON
Attesting Officer

EDWARD J. BRENNER
Commissioner of Patents